United States Patent
Lee et al.

(10) Patent No.: US 12,128,434 B2
(45) Date of Patent: Oct. 29, 2024

(54) ULTRASONIC SPRAY APPARATUS THAT BLOCKS AIR CONTACT TO PREVENT CHANGES IN PROPERTIES OF IONIZED WATER

(71) Applicants: Sung Ho Lee, Goyang-si (KR); Young Ho Lee, Goyang-si (KR)

(72) Inventors: Sung Ho Lee, Goyang-si (KR); Young Ho Lee, Goyang-si (KR)

(73) Assignees: Sung Ho Lee, Goysang-si (KR); Young Ho Lee, Goysang-si (KR)

( * ) Notice: Subject to any disclaimer, the term of this patent is extended or adjusted under 35 U.S.C. 154(b) by 391 days.

(21) Appl. No.: 17/641,572

(22) PCT Filed: Dec. 18, 2019

(86) PCT No.: PCT/KR2019/017937
§ 371 (c)(1),
(2) Date: Mar. 9, 2022

(87) PCT Pub. No.: WO2021/054539
PCT Pub. Date: Mar. 25, 2021

(65) Prior Publication Data
US 2022/0314261 A1    Oct. 6, 2022

(30) Foreign Application Priority Data
Sep. 18, 2019 (KR) .................. 10-2019-0114437

(51) Int. Cl.
*B05B 17/06* (2006.01)
*C02F 1/461* (2023.01)
*C02F 1/467* (2023.01)

(52) U.S. Cl.
CPC ............ *B05B 17/06* (2013.01); *C02F 1/4618* (2013.01); *C02F 1/467* (2013.01)

(58) Field of Classification Search
CPC ... B05B 17/06; B05B 17/0615; C02F 1/4618; C02F 1/467; C02F 1/36
See application file for complete search history.

(56) References Cited

U.S. PATENT DOCUMENTS 4,257,989 A    3/1981  Nishikawa
2012/0251296 A1 * 10/2012  Jorgensen ........... B05B 17/0607
                                                              415/116

FOREIGN PATENT DOCUMENTS

JP       2017056379 A     3/2017
KR    1020150056893 A     5/2010
(Continued)

OTHER PUBLICATIONS

ISR and Written Opinion in corresponding PCT Application No. PCT/KR2019/017937, dated Jun. 17, 2020.

*Primary Examiner* — Qingzhang Zhou
(74) *Attorney, Agent, or Firm* — BACON&THOMAS,PLLC

(57) ABSTRACT

An ultrasonic spray apparatus is configured to minimize contact between bubbles, which are generated due to ultrasonic excitation, and ionized water when the bubbles are discharged. The ultrasonic spray apparatus is configured so that a discharge pipe is installed to start from a bottom or a side surface of an accommodation space storing ionized water and protrude above the ionized water filled in the accommodation space. The bubbles are able to be discharged into the accommodation space through the discharge pipe. Changes in properties of the ionized water may be prevented. The properties of the ionized water may be utilized as they are. The discharge of the bubbles is possible even when anyone of the branched portions is blocked, and interference with a flow of the bubbles is prevented in (Continued)

advance even when water drops or the like generated inside the accommodation space block any one of the branched portions.

4 Claims, 2 Drawing Sheets

(56) References Cited

FOREIGN PATENT DOCUMENTS

| | | |
|---|---|---|
| KR | 1020160121711 A | 11/2010 |
| KR | 200451159 Y1 | 12/2010 |
| KR | 101378383 B1 | 3/2014 |
| KR | 101728010 B1 | 4/2017 |

* cited by examiner

ULTRASONIC SPRAY APPARATUS THAT BLOCKS AIR CONTACT TO PREVENT CHANGES IN PROPERTIES OF IONIZED WATER

CROSS-REFERENCE TO RELATED APPLICATION

This application claims the priority of and the benefit of Korean Patent Application No. 10-2019-0114437, filed on Sep. 18, 2019, the disclosure of which is incorporated herein by reference in its entirety.

BACKGROUND OF THE INVENTION

1. Field of the Invention

The present disclosure relates to an ultrasonic spray apparatus that blocks air contact to prevent changes in properties of ionized water, and more particularly, to an ultrasonic spray apparatus configured to, when bubbles, which are generated in a mounting space as ionized water filled in an accommodation space is atomized by ultrasonic excitation, are discharged to the accommodation space, minimize contact between the bubbles and the ionized water, thereby preventing changes in the properties of the ionized water and improving the spray effect and sterilization/moisturizing effect.

2. Discussion of Related Art

Generally, an ultrasonic spray apparatus is an apparatus for atomizing and spraying a liquid such as water and is used by being manufactured into various forms such as mist, spray, and humidifier in cosmetics. In (Patent Document 1) to (Patent Document 3) below, technology related to these various types of ultrasonic spray apparatuses are disclosed.

(Patent Document 1) Korean Utility Model Registration No. 20-0451159

This document relates to a spray for spraying a solution held in a container, and more particularly, to an ultrasonic spray in which the solution is sprayed by a pressure caused by pulling with fingers, the sprayed solution is atomized into fine particles due to passing through a metal vibrating part and then sprayed, and a pressure buffer part configured to buffer a pressure so that a pressure applied to the ejected solution is even is provided. Using the ultrasonic spray having the pressure buffer part according to the above configuration, it is convenient because a sprayed amount may be sensibly adjusted by manually adjusting the force caused by pulling with fingers while watching the situation each time, it is convenient to evenly spray the solution because it is possible to buffer the strength of pressure due to imbalance of the force caused by pulling with fingers, and it is convenient to maximize the spray effect because air is suctioned and blown by a blower fan.

(Patent Document 2) Korean Patent Publication No. 10-2015-0056893

This document relates to an ultrasonic spray apparatus including: a housing having a hollow formed therein; a spray nozzle which includes an inlet configured to pass through one end of the housing, a nozzle body connected to the inlet and disposed in the hollow inside the housing, and a nozzle tip configured to extend from the nozzle body and pass through the other end of the housing, the spray nozzle having a flow path connected to the inlet and configured to pass through the nozzle body and the nozzle tip formed therein; a piezoelectric element disposed inside the hollow, disposed at an outer circumference of the nozzle body, and configured to vibrate according to voltage application; a heating part disposed at an outer circumference of the nozzle tip and configured to heat the nozzle tip; and a supply tube inserted into the flow path and configured to supply a liquid.

(Patent Document 3) Korean Patent Publication No. 10-2016-0121711

This document relates to an ultrasonic air freshener spray system including a spray part which includes an ultrasonic vibrator having a spray groove, a liquid part which is disposed to come in contact with the spray part, a spray groove opening/closing part disposed at an upper end of the spray part, a driving circuit part which is electrically connected to the ultrasonic vibrator, and an external power source part which is electrically connected to the driving circuit part. Thus, it is possible to reduce manufacturing costs, there is no risk of explosion, and minimization of volume and noiseless operation are possible. Also, filling a spray liquid is possible, the spray part and the liquid part may be easily replaced, and the ultrasonic air freshener spray system may be continuously used for a long period of time.

However, the conventional spray apparatuses using ultrasonic waves have the following problems.

(1) Generally, the spray apparatuses can be used without problems when spraying a fluid such as tap water, but when used for ultrasonic spraying of ionized water such as oxidized water or reduced water, the spray apparatuses cause the function of ionized water to be lost.

(2) That is, in the conventional ultrasonic spray apparatuses, when water used in spraying exits a tank or the like, outside air or bubbles generated due to ultrasonic excitation fill the tank by as much as the amount of water that has exited the tank. Here, the outside air entering the tank from outside the tank or bubbles generated due to ultrasonic excitation are affected by an ultrasonic generator used in ultrasonic spraying and, as shown in FIG. 1, cause a phenomenon similar to a vortex phenomenon due to excitation.

(3) In FIG. 1, a part that spins like a whirlwind in a transparent window which appears to be transparent shows the flow of the bubbles filling the tank. In this way, the outside air entering the tank comes in contact with water remaining in the tank, and here, when ionized water is used in spraying, the ionized water loses its function due to changes in properties of the ionized water.

(4) In more detail, due to atomization, as water exits the tank, the outside air as much as the amount of water that has exited the tank floats in the form of bubbles from below the ionized water to above the ionized water due to the ultrasonic excitation phenomenon. Here, when the bubbles are excited due to receiving ultrasonic waves, the bubbles spin like a whirlwind and flow over a wide area of the inside of the tank, thus coming in contact with a wide area of the ionized water. Accordingly, the amount of ionized water coming in contact with the bubbles increases, and properties of the ionized water coming in contact with the bubbles change, causing the ionized water to lose its function as the ionized water.

(5) For example, when a hydrogen water solution filled with an oxidation-reduction potential of −650 mV was filled in a water tank of the conventional ultrasonic spray apparatus, the hydrogen water solution was sprayed while applying ultrasonic vibration for 10 to 20 seconds, and oxidation-reduction power remaining in the water tank was measured, the following changes in properties occurred. The oxidation-reduction potential of the hydrogen water was measured to be +230 mV after spraying for 10 seconds, and the oxidation-reduction potential of the hydrogen water was measured to be +580 mV after spraying for 20 seconds. From such results, it can be seen that oxidation occurred due to changes in properties of the ionized water filled in the water tank.

(6) Also, when a hydroxide ion solution filled with an oxidation-reduction potential of +1,020 mV was filled in a water tank of the conventional ultrasonic spray apparatus, the hydroxide ion solution was sprayed while applying ultrasonic vibration for 10 to 20 seconds, and oxidation-reduction power remaining in the water tank was measured, the following changes in properties occurred. The oxidation-reduction potential of the hydroxide ions was measured to be +850 mV after spraying for 10 seconds, and the oxidation-reduction potential of the hydroxide ions was measured to be +450 mV after spraying for 20 seconds. From such results, it can be seen that oxidation occurred due to changes in properties of the ionized water filled in the water tank.

SUMMARY OF THE INVENTION

The present disclosure is directed to providing an ultrasonic spray apparatus that blocks air contact to prevent changes in properties of ionized water, the ultrasonic spray apparatus configured to, when bubbles, which are generated in a mounting space due to ultrasonic excitation of ionized water to be sprayed, are discharged to an accommodation space, minimize contact between the bubbles and the ionized water filled in the accommodation space, thereby preventing changes in the properties of the ionized water caused by the ionized water coming in contact with the bubbles on which ultrasonic excitation occurred and preventing an effect of the ionized water from decreasing.

In particular, the present disclosure is also directed to providing an ultrasonic spray apparatus that blocks air contact to prevent changes in properties of ionized water, the ultrasonic spray apparatus configured to have a discharge pipe installed to start from a bottom or a side surface of an accommodation space storing ionized water and protrude above the ionized water filled in the accommodation space so that bubbles generated due to ultrasonic excitation are able to be discharged into the accommodation space through the discharge pipe. In this way, changes in properties of the ionized water, which may occur as the bubbles come into contact with the ionized water, may be prevented, and thus the properties of the ionized water may be utilized as they are.

In addition, the present disclosure is also directed to providing an ultrasonic spray apparatus that blocks air contact to prevent changes in properties of ionized water, the ultrasonic spray apparatus configured to have an end of a discharge pipe, which protrudes above ionized water, branched into at least two portions, so that discharge of bubbles is possible even when any one of the branched portions is blocked, and interference with a flow of bubbles is prevented in advance even when water drops or mist generated inside an accommodation space block any one of the branched portions.

The present disclosure provides an ultrasonic spray apparatus that blocks air contact to prevent changes in properties of ionized water, which is an ultrasonic spray apparatus that performs spraying using ionized water, the ultrasonic spray apparatus including: a main body (100) which includes an accommodation space (110) configured to accommodate the ionized water, a mounting space (120) configured below or beside the accommodation space (110), and a discharge pipe (130) configured to discharge bubbles, which are generated due to ultrasonic excitation in the mounting space (120), into the accommodation space (110); and a spray module (200) which is installed in the mounting space (120) and has an ultrasonic generator (210) to cause ultrasonic excitation of ionized water moving from the accommodation space (110) to the mounting space (120) and atomize the ionized water and then spray the ionized water to the outside of the main body (100), wherein the discharge pipe (130) is installed to have one side submerged in the ionized water and the other side protruding above the ionized water to discharge the bubbles, which are generated due to excitation of the ultrasonic generator (210) in the mounting space (120), to above the ionized water of the accommodation space (110).

In particular, the mounting space (120) may be manufactured to have a form in which an upper portion is convex upward, and the discharge pipe (130) may be configured so that the one side submerged in the ionized water is able to discharge the bubbles from the convex portion of the mounting space (120).

Also, the discharge pipe (130) may be formed so that an end thereof protruding above the ionized water filled in the accommodation space (110) is branched into at least two portions.

In addition, the ionized water used by being filled in the accommodation space (110) may be hydrogen water, acid water, alkaline water, or sterilization water.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF THE INVENTION

Figure 1:
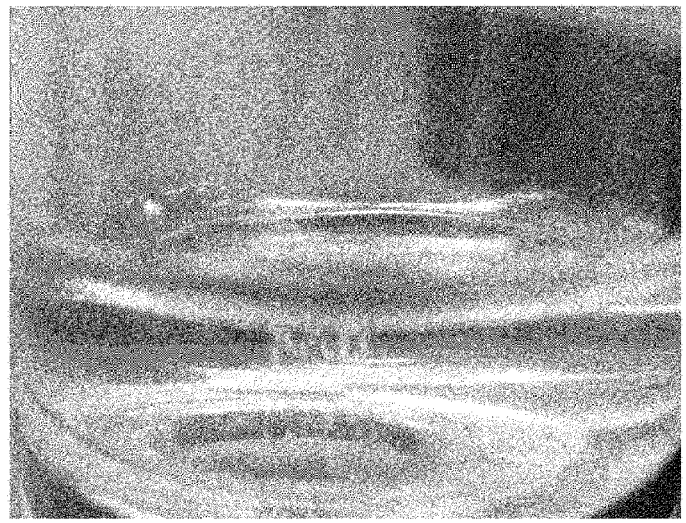
FIG. 1 is a picture showing a state in which bubbles generated due to ultrasonic excitation come in contact with ionized water in a process in which ionized water is held in a conventional ultrasonic spray apparatus and sprayed.

Hereinafter, preferred embodiments of the present disclosure will be described in more detail with reference to the accompanying drawings. Prior to the description, it should be noted that terms or words used in this specification and the claims should not be construed as being limited to their ordinary or dictionary meanings and should be construed as having a meaning and concept consistent with the technical spirit of the present disclosure according to the principle that the inventor can appropriately define the concept of the term in order to best describe his or her invention.

Therefore, embodiments described herein and configurations illustrated in the drawings are only the most preferred embodiment of the present disclosure and do not represent the entire technical spirit of the present disclosure. Thus, it should be understood that various equivalents and modifications that may substitute the embodiments described herein may be present at the time of filing this application.
(Configuration)

Figure 2:
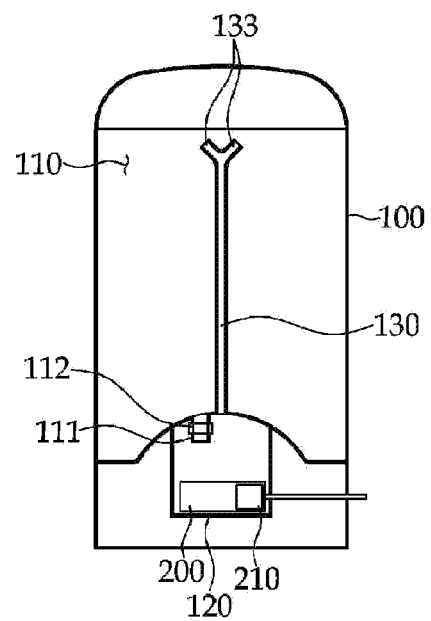
FIG. 2 is a cross-sectional view showing the overall configuration of an ultrasonic spray apparatus according to the present disclosure.
Figure 3:
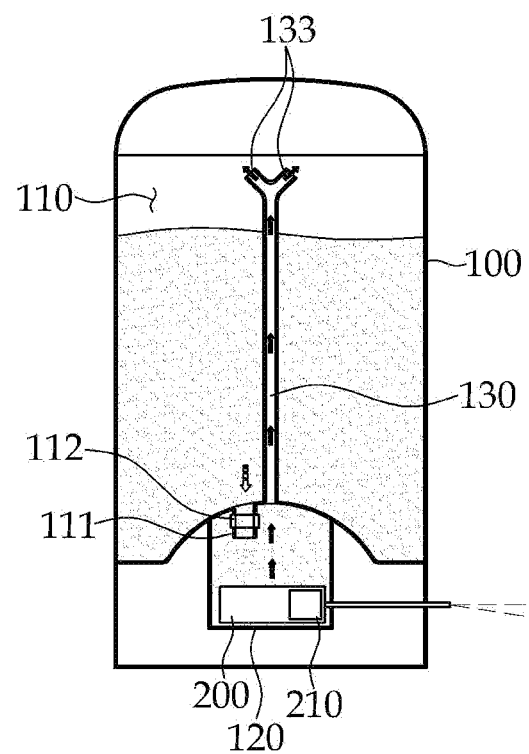
FIG. 3 is a cross-sectional view showing a process of spraying using the ultrasonic spray apparatus according to the present disclosure.

As illustrated in FIGS. 2 and 3, an ultrasonic spray apparatus that blocks air contact to prevent changes in properties of ionized water according to the present disclosure includes a main body 100, a spray module 200, and an ultrasonic generator 210.

In particular, the main body 100 includes a discharge pipe 130 configured to discharge bubbles generated due to ultrasonic excitation to an accommodation space 110, and air contact is minimized between ionized water and the bubbles discharged through the discharge pipe 130. In this way, by preventing changes in properties of the ionized water, effects of the properties of the ionized water may be utilized as they are.

Here, the discharge pipe 130 constitutes a mounting space 120 so that the bubbles generated due to ultrasonic excitation may be discharged into the accommodation space 110 through a portion partitioning the accommodation space 110, which is configured to store the ionized water, and the mounting space 120, which is configured to mount the spray module 200 or the like, wherein an upper portion of the mounting space 120 is formed to be convex upward, and the discharge pipe 130 is installed to begin at the convex upper portion. Thus, the bubbles may gather at the convex portion and be discharged into the accommodation space 110 through the discharge pipe 130. In this way, the bubbles may be immediately discharged into the accommodation space 110 without stagnating or staying inside the mounting space 120.

Also, one side end of the discharge pipe 130 that protrudes above the ionized water inside the accommodation space 110 is configured to be branched into at least two portions. Thus, even when any one of the branched portions is blocked, the bubbles generated due to ultrasonic excitation may be smoothly discharged into the accommodation space 110 from the mounting space 120, and even when water drops or the like formed in a spray process block an end portion of the discharge pipe 130, the bubble discharging action may be smoothly performed through the other side.

Hereinafter, the above configurations will be described in more detail with reference to the accompanying drawings. Hereinafter, "bubbles" refer to bubbles that are generated as ionized water is atomized and sprayed by excitation using an ultrasonic generator which will be described below and may be air entering from outside the apparatus according to the present disclosure, may be air bubbles contained in the ionized water, or may be both the outside air and the air bubbles of the ionized water.

A. Main Body

As illustrated in FIGS. 2 and 3, the main body 100 receives and stores ionized water and supplies the stored ionized water to perform ultrasonic spraying.

As illustrated in FIGS. 2 and 3, the main body 100 includes the accommodation space 110, the mounting space 120, and the discharge pipe 130.

1. Accommodation Space

As illustrated in FIGS. 2 and 3, the accommodation space 110 is a space for storing the ionized water. Here, the accommodation space 110 has a stopper to allow the ionized water to be injected from the outside, and the stopper is configured to be opened and closed. Also, preferably, the stopper may be configured to seal the accommodation space 110.

Here, the ionized water is water containing negative charged ions or positive charged ions. Hydrogen water obtained by electrolysis of water, acid water, alkaline water, or sterilization water containing hypochlorous acid and sodium hypochlorite may be used as the ionized water. Here, as the ionized water, water electrolyzed through an external electrolyzer or the like for electrolysis of water may be received in the accommodation space 110 and used, or an electrolyzer or the like for electrolysis of water may be mounted on the main body 100, and ionized water electrolyzed by the electrolyzer may be stored in the accommodation space 110 and then used.

Also, in the accommodation space 110, as illustrated in FIGS. 2 and 3, a supply pipe 111 is configured to supply the ionized water to the spray module 200 which will be described below. Here, in the supply pipe 111, a valve 112 may be disposed to supply the ionized water only toward one side (here, only toward the spray module 200 which will be described below) like a check valve. Preferably, the valve 112 may be configured to be in a closed state and then be opened to supply the ionized water, which is necessary for spraying, from the accommodation space 110 to the spray module 200 only when an air pressure or the like necessary for spraying is applied from the spray module 200 which will be described below.

2. Mounting Space

As illustrated in FIGS. 2 and 3, the mounting space 120 is configured to be disposed below or beside the accommodation space 110. Here, the spray module 200 which will be described below may be mounted on the mounting space 120, and the mounting space 120 may be configured at any other position as long as the position allows the ionized water to be easily received from the accommodation space 110 and be atomized through ultrasonic excitation and sprayed.

In a preferred embodiment of the present disclosure, as illustrated in FIGS. 2 and 3, the mounting space 120 may be configured below the accommodation space 110 to allow the ionized water stored in the accommodation space 110 to be easily naturally supplied to the spray module 200 installed in the mounting space 120 using gravity or the like.

Also, in a preferred embodiment of the present disclosure, as illustrated in FIGS. 2 and 3, the mounting space 120 may be configured to have an upper surface that is convex upward. This is to allow bubbles, which are generated due to ultrasonic excitation in the mounting space 120 through the discharge pipe 130 which will be described below, to gather in the convex portion of the mounting space 120. The gathered bubbles may be immediately discharged into the accommodation space 110 through the discharge pipe 130 which will be described below that starts at the convex portion, without stagnating or staying in the mounting space 120 for a long period of time.

3. Discharge Pipe

As illustrated in FIGS. 2 and 3, the discharge pipe 130 discharges the bubbles, which are generated due to ultrasonic excitation of the ultrasonic generator 210 of the spray module 200 which will be installed in the mounting space 120, into the accommodation space 110 and allows the bubbles to gather above the ionized water while minimizing contact between the bubbles and the ionized water.

To this end, as illustrated in FIGS. 2 and 3, the discharge pipe 130 has one side connected to the mounting space 120 to discharge bubbles generated in the mounting space 120 and has the other side extending toward the inside of the accommodation space 110 to discharge the bubbles into the accommodation space 110. Here, the discharge pipe 130 fitted inside the accommodation space 110 is configured to protrude above the maximum height of the ionized water filled in the accommodation space 110 so that, when the bubbles generated in the mounting space 120 are discharged into the accommodation space 110 through the discharge pipe 130, contact between the bubbles and the ionized water is minimized.

In more detail, when the discharge pipe 130 of the present disclosure is not present, the bubbles immediately enter the accommodation space 110 from the mounting space 120, and due to ultrasonic excitation of the ultrasonic generator 210 which will be described below, the bubbles flow like a vortex and come in contact with the ionized water, causing the properties of the ionized water to change. In particular, the bubbles move like a whirlwind throughout a wide area and come in contact with the ionized water through the wide area, causing the properties of the ionized water to change. However, the discharge pipe 130 is configured so that the bubbles move through a predetermined path and, particularly, do not come in contact with the ionized water. In this way, changes in the properties of the ionized water that may occur due to contact between the ionized water and the bubbles (air) may be prevented in advance.

Here, as illustrated in FIGS. 2 and 3, preferably, a side of the discharge pipe 130 that is mounted on the mounting space 120 side may be mounted on the convex portion of the mounting space 120 as described above. Also, a valve similar to a check valve may be mounted in the discharge pipe 130 installed in the mounting space 120, and preferably, when the valve 112 is opened, causing the ionized water to exit and the pressure inside the accommodation space 110 to be decreased, the bubbles generated due to ultrasonic excitation may be introduced from the mounting space 120 into the accommodation space 110 through the discharge pipe 130.

Also, preferably, as illustrated in FIGS. 2 and 3, the other side of the discharge pipe 130 that is inserted into the accommodation space 110 may be formed with a height that prevents submerging into the ionized water filled in the accommodation space 110. This is to minimize contact between the bubbles entering the accommodation space 110 through the discharge pipe 130 and the ionized water in order to prevent changes in properties of the ionized water, such as the oxidation-reduction power of the ionized water, caused by the bubbles excited through the ultrasonic generator 210, which will be described below, and discharged from the mounting space 120 to the accommodation space 110.

Also, preferably, as illustrated in FIGS. 2 and 3, one side of the discharge pipe 130 that is fitted inside the accommodation space 110 and installed to protrude above the ionized water may be configured to be branched into at least two portions and include at least two outlets 133. This is to, even when any one outlet 133 is blocked during use or water drops or the like block any one outlet 133 in a spraying process, allow the bubbles generated due to ultrasonic excitation to be smoothly discharged through the other outlet 133 that is not blocked. Also, the two branched outlets 133 may be manufactured in various shapes such as a U-shape and a Y-shape.

B. Spray Module

As illustrated in FIGS. 2 and 3, as the spray module 200, a module manufactured using common technology that receives air from the outside and discharges the air in a certain direction and receives ionized water through the supply pipe 111 and causes ultrasonic excitation to atomize the ionized water may be used.

Here, although not illustrated in the drawings, anything that is necessary for spraying and manufactured using common technology, e.g., a configuration such as an air blower that pumps air with a predetermined pressure or receives or generates compressed air, a configuration that receives the ionized water from the accommodation space 110 and uses an air flow to atomize or facilitate atomization of the ionized water, or a heating means such as a heater that preheats the ionized water to allow the ionized water to be easily atomized, may be used as the spray module 200.

In a preferred embodiment of the present disclosure, as illustrated in FIGS. 2 and 3, the spray module 200 atomizes the ionized water through the ultrasonic generator 210.

Ultrasonic Generator

As illustrated in FIGS. 2 and 3, anything that is manufactured using common technology and is installed in the mounting space 120 to excite ultrasonic waves and transmit the excited ultrasonic waves to the ionized water to atomize the ionized water may be used as the ultrasonic generator 210.

The ultrasonic generator 210 is illustrated in FIGS. 2 and 3 as being separately configured from the spray module 200, but preferably, the ultrasonic generator 210 may be used by being configured within the spray module 200.

Using the ultrasonic spray apparatus that blocks air contact to prevent changes in properties of ionized water according to the present disclosure that is configured as described above, the oxidation-reduction power was measured for ionized water (reducing hydrogen water). As a result, it was configured as below that changes in properties of the ionized water in the accommodation space did not occur.

[Measurement of Oxidation-Reduction Power]

First, 50 ml of reducing hydrogen water with an oxidation-reduction potential of −650 mV was filled in the accommodation space. Then, the reducing hydrogen water was sprayed for 10 to 20 seconds using the ultrasonic spray apparatus according to the present disclosure, and then the oxidation-reduction potential was measured. As a result, after operation for 10 seconds, the oxidation-reduction potential of the reducing hydrogen water was −650 mV, and after operation for 20 seconds, the oxidation-reduction potential of the reducing hydrogen water was −648 mV, which proved that there was almost no change in properties.

Also, 100 ml of hydroxide ion water with an oxidation-reduction potential of +1,020 mV was filled in the accommodation space. Then, the hydroxide ion water was sprayed for 10 to 20 seconds using the ultrasonic spray apparatus according to the present disclosure, and then the oxidation-reduction potential was measured. As a result, after operation for 10 seconds, the oxidation-reduction potential of the hydroxide ion water was +1,020 mV, and after operation for 20 seconds, the oxidation-reduction potential of the hydroxide ion water was +1,018 mV, which proved that there was almost no change in properties.

An ultrasonic spray apparatus that blocks air contact to prevent changes in properties of ionized water according to the present disclosure has the following effects.

(1) Contact between bubbles, which are generated due to ultrasonic excitation in a mounting space as ionized water is atomized and sprayed, and the ionized water is minimized. In this way, an effect of preventing changes in properties of the ionized water can be improved.

(2) This prevents changes in properties of the ionized water, such as a change in the oxidation-reduction power of the ionized water coming in contact with the bubbles generated due to ultrasonic excitation and allows inherent properties of the ionized water to be sufficiently utilized.

(3) In particular, since a discharge pipe is configured to pass through an accommodation space, which stores the ionized water, from a lower portion to an upper portion of the accommodation space, permeation of outside air or bubbles into the accommodation space can be blocked when the ionized water is not sprayed, and when the ionized water is sprayed, bubbles generated due to ultrasonic excitation are discharged into the accommodation space through the discharge pipe by as much as the amount of sprayed ionized water, and thus the spray effect can be improved.

(4) Here, the discharge pipe is configured to start at a bottom of the accommodation space, that is, a portion where an upper plate portion distinguishing the accommodation space and the mounting space is configured to be convex upward. Thus, instead of stagnating for a long period of time in the mounting space, the bubbles generated due to ultrasonic excitation gather at the convex portion and are immediately discharged into the accommodation space through the discharge pipe. In this way, it is possible to smoothly block contact between the generated bubbles and the ionized water in a main body.

(5) In addition, since the other end of the discharge pipe that protrudes above the ionized water is configured to be branched into at least two portions, even when any one of the branched portions is blocked, the bubbles generated due to ultrasonic excitation can always be discharged through the other one of the branched portions. Furthermore, even when water drops formed in the accommodation space enter through the discharge pipe, the bubbles can be discharged through the other portion, and thus safe use is possible.

As described above, according to the present disclosure, by the ultrasonic spray apparatus that blocks air contact to prevent changes in properties of ionized water, contact between fine bubbles, which are discharged by ultrasonic vibration as ionized water is atomized, and the ionized water is minimized. In this way, changes in properties of the ionized water that occur as the excited bubbles come in contact with the ionized water through a wide area are prevented, and thus atomization may occur in a state in which the properties of the ionized water are not changed.

What is claimed is:

1. An ultrasonic spray apparatus that blocks air contact to prevent changes in properties of ionized water, which is an ultrasonic spray apparatus that performs spraying using ionized water, the ultrasonic spray apparatus comprising:

a main body which includes an accommodation space configured to accommodate the ionized water, a mounting space configured below or beside the accommodation space, and a discharge pipe configured to discharge bubbles, which are generated due to ultrasonic excitation in the mounting space, into the accommodation space; and a spray module which is installed in the mounting space and has an ultrasonic generator to cause ultrasonic excitation of ionized water moving from the accommodation space to the mounting space and atomize the ionized water and then spray the ionized water to the outside of the main body, wherein the discharge pipe is installed to have one side submerged in the ionized water and the other side protruding above the ionized water to discharge the bubbles, which are generated due to excitation of the ultrasonic generator in the mounting space, to above the ionized water of the accommodation space, the mounting space is manufactured to have a form in which an upper portion is convex upward; and the discharge pipe is configured so that the one side submerged in the ionized water is able to discharge the bubbles from the convex portion of the mounting space.

2. The ultrasonic spray apparatus of claim 1, wherein the discharge pipe is formed so that an end of the discharge pipe that protrudes above the ionized water filled in the accommodation space is branched into at least two portions.

3. The ultrasonic spray apparatus of claim 1, wherein the ionized water used by being filled in the accommodation space is hydrogen water, acid water, alkaline water, or sterilization water.

4. The ultrasonic spray apparatus of claim 2, wherein the ionized water used by being filled in the accommodation space is hydrogen water, acid water, alkaline water, or sterilization water.

* * * * *